United States Patent
Herrera et al.

(10) Patent No.: US 10,141,763 B2
(45) Date of Patent: Nov. 27, 2018

(54) SOFT START METHOD AND CIRCUIT

(71) Applicant: Analog Devices, Inc., Norwood, MA (US)

(72) Inventors: Sandro Herrera, Medford, MA (US); Alan K Jeffery, North Andover, MA (US)

(73) Assignee: Analog Devices, Inc., Nonwood, MA (US)

( * ) Notice: Subject to any disclaimer, the term of this patent is extended or adjusted under 35 U.S.C. 154(b) by 49 days.

(21) Appl. No.: 15/258,897

(22) Filed: Sep. 7, 2016

(65) Prior Publication Data

US 2018/0069407 A1    Mar. 8, 2018

(51) Int. Cl.
*H02J 7/04* (2006.01)
*H02J 7/16* (2006.01)
*H02J 7/00* (2006.01)

(52) U.S. Cl.
CPC .............. *H02J 7/007* (2013.01); *H02J 7/008* (2013.01); *H02J 7/0029* (2013.01); *H02J 7/0068* (2013.01); *H02J 2007/0039* (2013.01); *H02J 2007/0059* (2013.01)

(58) Field of Classification Search
CPC ........ H02J 7/022; H02J 7/0093; H02J 7/0068; H02J 7/0072; Y02E 60/12
USPC ...................................................... 320/145
See application file for complete search history.

(56) References Cited

U.S. PATENT DOCUMENTS

| | | | |
|---|---|---|---|
| 6,768,290 B1 | 7/2004 | Smith | |
| 6,815,938 B2 | 11/2004 | Horimoto | |
| 6,998,829 B2 | 2/2006 | Solie | |
| 2007/0127276 A1* | 6/2007 | Yoshimatsu | ............ H02M 1/36 363/49 |
| 2010/0060248 A1* | 3/2010 | Kao | ........................ G05F 1/10 323/280 |
| 2010/0164462 A1* | 7/2010 | Yen | ........................ H02M 1/36 323/288 |
| 2012/0313606 A1 | 12/2012 | Jung, II | |
| 2013/0234667 A1* | 9/2013 | Norton | ................ H01M 10/441 320/122 |
| 2015/0084554 A1* | 3/2015 | Tsuruta | .................... H02P 1/16 318/139 |

* cited by examiner

*Primary Examiner* — Arun C Williams
(74) *Attorney, Agent, or Firm* — Schwegman Lundberg & Woessner, P.A.

(57) ABSTRACT

A soft start amplifier provides a soft-start function that controls a battery charging current in a feedback loop charging circuit by selecting the lowest voltage between a soft start voltage and an error derived control voltage. The lowest voltage is used as a control signal for controlling the battery charging current in the feedback loop charging circuit. The error voltage is a difference between a voltage proportional to the charging current and a voltage proportional to the target charging current while the soft start voltage is a voltage configured to ramp up with time. Using the lower voltage of the error voltage and the soft start voltage reduces the inrush current that may occur when the error derived control voltage spikes to the supply voltage in an attempt to correct the initial difference between the target charging current and a measured charging current.

33 Claims, 8 Drawing Sheets

US 10,141,763 B2

SOFT START METHOD AND CIRCUIT

FIELD OF THE DISCLOSURE

This document pertains generally, but not by way of limitation, to the field of integrated circuits and, in particular, to soft start circuits to reduce inrush current during circuit startup.

BACKGROUND

When some circuits are first powered up, they draw a large amount of current during start up. For example, a battery charging circuit can have a target current for charging the battery. When the charging circuit is first turned on, the circuit can bring the current into the battery from zero to the target current as quickly as possible. This can result in the battery experiencing a current overshoot, a current that is substantially larger than the target current. Such a large inrush of current can damage the battery as well as the charging circuit.

SUMMARY OF THE DISCLOSURE

The present inventors have recognized, among other things, a need for a soft start method and circuit that reduces inrush current during a battery charger power up. A soft start amplifier provides a soft-start function that controls a battery charging current in a feedback loop charging circuit by selecting the lowest voltage between a soft start voltage and a controller output voltage. The lowest voltage may be used as a control signal for controlling the battery charging current in the feedback loop charging circuit. The controller output voltage is the amplified difference between a voltage proportional to the measured charging current and a voltage proportional to the target charging current, while the soft start voltage is based on an external voltage. Using the lower voltage of the controller output voltage and the soft start voltage may reduce the inrush current that may occur when the controller output voltage spikes to the supply voltage in an attempt to correct the initial difference between the target charging current and a measured charging current.

One embodiment for reducing an inrush current in a charging circuit may include sensing an error voltage proportional to the difference between a measured current and a target reference current, generating a soft start control voltage, and generating a charging current control voltage for controlling the charging current wherein the charging current control voltage may be a lowest voltage of the amplified error voltage or the soft start control voltage.

Another embodiment for reducing an inrush current in a charging circuit may include generating a charging current on a charging line coupled to a battery, generating a measured battery charging current indication, determining a charging current difference in response to the measured battery charging current indication and a target charging current, generating an error voltage indicative of the difference, generating a soft start control voltage based on a power supply voltage, and adjusting the charging current in response to a lowest voltage of the amplified error voltage and the soft start control voltage.

A charging circuit embodiment that reduces inrush current during power up may include an amplifier circuit coupled to a battery to measure the battery current, an error amplifier circuit that may generate an output voltage indicative of a difference between a charging current and a target charging current, a soft start circuit that may generate a soft start control voltage, and a power converter circuit coupled to the error amplifier circuit and the soft start circuit that may generate the charging current responsive to a lower voltage of the error amplifier output voltage or the soft start control voltage.

This section is intended to provide an overview of the subject matter of the present patent application. It is not intended to provide an exclusive or exhaustive explanation of the invention. The detailed description is included to provide further information.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A battery charging circuit can comprise a feedback loop circuit that is constantly measuring a battery charging current and battery voltage as the battery charges. The charging circuit typically operates in two modes: a constant current mode and a constant voltage mode. When the battery first begins to charge, the constant current mode provides a constant current to the battery to increase the battery's voltage. Once the battery reaches a target voltage for that particular battery technology, the battery voltage is kept constant while the battery current decreases. During constant current mode, the feedback loop circuit of the charging circuit measures the battery charging current and battery voltage and determines an error voltage proportional to the difference between the measured battery charging current and a target charging current.

The error voltage proportional to the difference between the measured battery charging current and the target charging current is amplified to generate a voltage that is used to control the current going into the battery for charging. For example, if the error is positive, the feedback loop increases the current into the battery. If the error is ti negative, the feedback loop decreases the current into the battery. The target charging current is set in order to charge the battery to the target voltage.

A problem exists when the charging circuit is first turned on to charge the battery. The circuit is at zero current at time zero. However, the circuit has a relatively large non-zero target charging current. The error detection of the feedback loop senses the difference between the present current (e.g., 0 A) and the target charging current (e.g., 10 A) and generates a control signal that instructs a power converter circuit to output as much current as possible to eliminate that difference quickly. This results in a large inrush of current at circuit power up in order to bring the initial charging current to the target current. The inrush of current can be substantially greater than the target current, thus increasing the risk of damaging circuit components or even the battery being charged.

The inventors have determined that adding a soft start circuit to the feedback loop can be used to reduce that inrush current at power up. The soft start circuit restrains the control signal to the power converter circuit from instructing the power converter circuit to output as much current as possible when first powered up.

Figure 1:
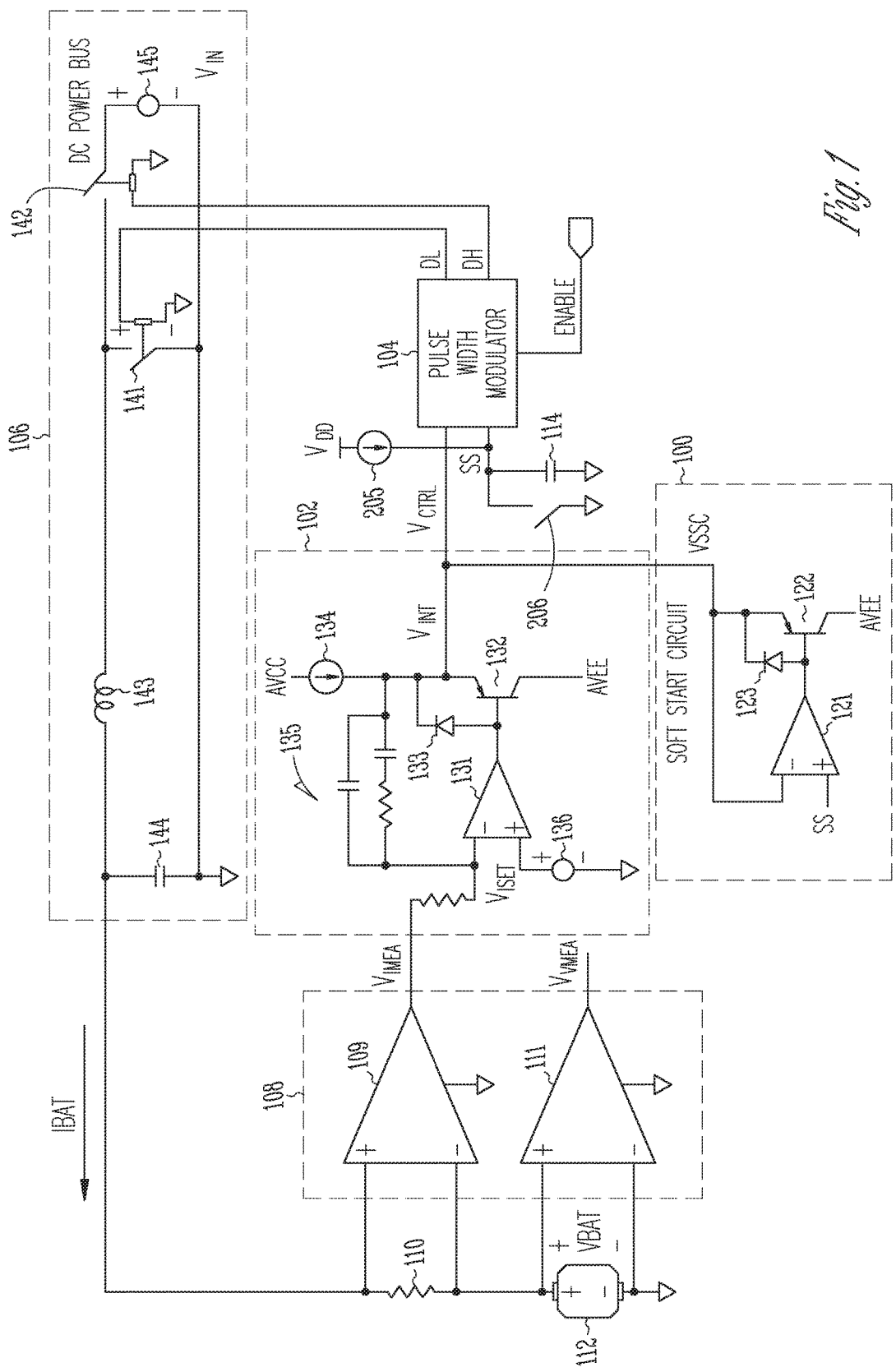
FIG. 1 is a schematic diagram of a battery charging circuit having a soft start circuit, such as in accordance with various embodiments.

FIG. 1 is a schematic diagram of a constant current battery charging circuit having a soft start circuit, such as in accordance with various embodiments. This circuit is for purposes of illustration of a feedback circuit that can implement the method for reducing inrush current as disclosed herein. Other embodiments can use other circuits to achieve substantially similar results using the method of FIG. 5.

The constant current battery charging circuit includes a soft start circuit 100, an error amplifier circuit 102, a pulse width modulator circuit 104, a power converter circuit 106, an analog front end (AFE) 108, a current measurement resistance 110, a battery 112 to be charged, and a capacitance 114. The soft start circuit 100 includes an amplifier 121, a transistor 122 (e.g., pnp bipolar junction transistor (BJT)), and a diode 123. The error amplifier circuit 102 includes an amplifier 131, a transistor 132 (e.g., pnp BJT), a diode 133, a current source 134, an amplifier feedback circuit 135, and a battery charge current reference circuit 136. The power converter 106 includes a first switch 141, a second switch 142, an inductance 143, a capacitance 144, and a voltage source 145. The analog front end 108 includes a current sense amplifier 109 and a voltage sense amplifier 111.

In the soft start circuit 100, a first input of the amplifier 121 is coupled to a soft start voltage node SS. A second input of the amplifier 121 is coupled to an output stage circuit comprising the transistor 122 and diode 123. An output of the amplifier 121 is coupled to a base node of the transistor 122 and an anode of the diode 123. A collector node of the transistor 122 is coupled to a negative supply voltage (AVEE). An emitter node of the transistor 122 is coupled to a cathode of the diode 123, the second input of the amplifier 121, and an output of the soft start circuit 100. The output of the soft start circuit 100 is subsequently referred to as outputting a soft start control voltage signal $V_{SSC}$.

In the error amplifier circuit 102, a first input of the amplifier 131 is coupled to the current setting reference 136. A second input of the amplifier 131 is coupled to the amplifier feedback circuit 135. An output of the amplifier 131 is coupled to a base node of the transistor 132 and an anode of the diode 133. A collector node of the transistor 132 is coupled to the negative supply voltage (AVEE). An emitter node of the transistor 132 is coupled to a cathode of the diode 133, the current source 134, and an output of the error amplifier circuit 102. The output of the error amplifier circuit 102 is subsequently referred to as outputting an intermediate control voltage signal $V_{INT}$. The amplifier feedback circuit 135 is coupled to the output of the error amplifier circuit 102 and the current source 134. The current source 134 is coupled to a positive supply voltage (AVCC).

Figure 2:
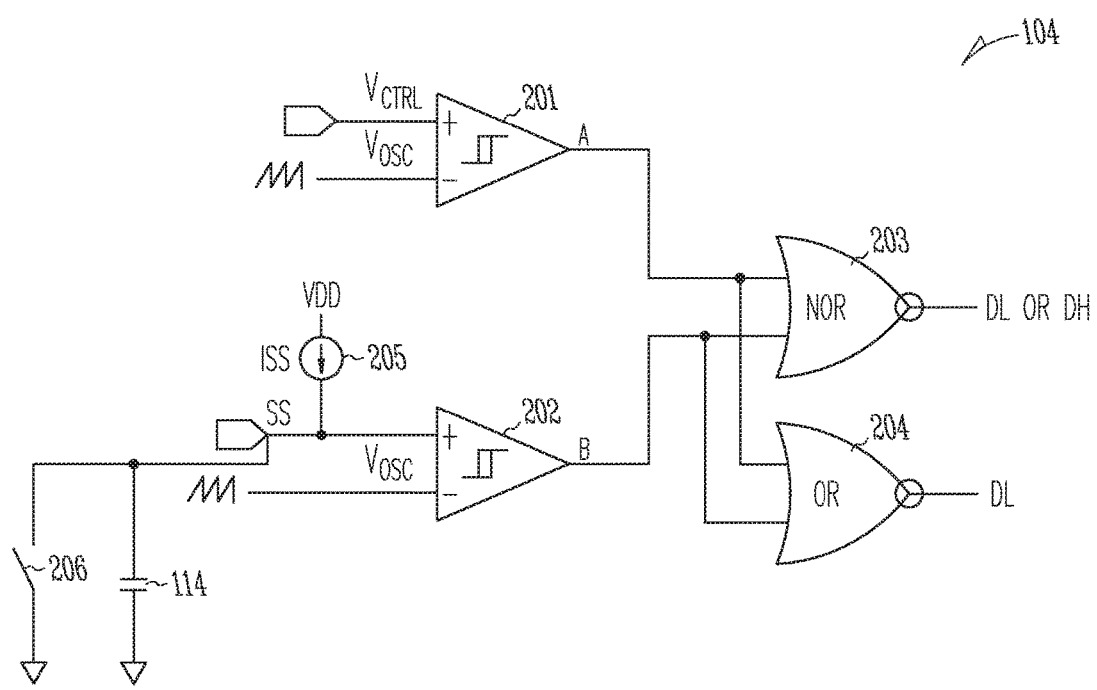
FIG. 2 is a block diagram of one example of a pulse width modulator, such as in accordance with various embodiments.

The pulse width modulator 104 includes a $V_{CTRL}$ input as the control signal. As described subsequently, the $V_{CTRL}$ signal is the lowest voltage of the $V_{INT}$ signal or the $V_{SSC}$ signal. The pulse width modulator 104 further includes a soft start voltage input coupled to the capacitance 114. An enable input (ENABLE) enables operation of the pulse width modulator 104. Two control outputs (e.g., DL and DH) are output from the pulse width modulator 104. As discussed subsequently, DL and DH are duty cycle signals to the power converter 106 where the phase of the DL signal is opposite to the phase of the DH signal. FIG. 2 illustrates one example of a pulse width modulator 104.

FIG. 2 is a block diagram of one example of the pulse width modulator 104, such as in accordance with various embodiments. This block diagram is for purposes of illustration only as other circuits may be used to accomplish substantially the same results.

The pulse width modulator 104 includes a NOR function 203 (e.g., NOR gate), an OR function 204 (e.g., OR gate), a first comparator 201, a second comparator 202, and a current source 205. The first comparator 201 has one input coupled to the $V_{CTRL}$ signal from FIG. 1 and a second input coupled to an oscillator signal $V_{OSC}$. The second comparator 202 has one input coupled to the soft start node (SS) and capacitor 114 from FIG. 1. This input is also coupled to the current source 205 that is pulled up to a positive supply voltage ($V_{DD}$). The second input of the second amplifier 202 is coupled to the oscillator signal $V_{OSC}$. The outputs of the comparators 201, 202 are input to the NOR function 203 that outputs the $D_H$ control signal of FIG. 1. The outputs of the comparators 201, 202 are input to the OR function 204 that outputs the $D_L$ control signal of FIG. 1.

Referring again to FIG. 1, the power converter 106 includes the second switch 142 coupled between the voltage source 145 (e.g., positive node) and one side of the first switch 141 and one side of the inductance 143. The second side of the inductance 143 is coupled to one side of the capacitance 144 and an output of the power converter 106. The second side of the first switch 141 is coupled to circuit ground, the voltage source 145 (e.g., negative node), and second side of the capacitance 144. The output of the power converter 106 is a charging line carrying the battery charge current $I_{BAT}$ as shown. The first switch 141 is controlled (e.g., turned on and turned off) by the DL signal from the pulse width modulator 104. The second switch 142 is controlled (e.g., turned on and turned off) by the DH signal from the pulse width modulator 104.

The analog front end 108 includes the current sense amplifier 109 coupled to the resistance 110 used to measure the battery charge current $I_{BAT}$. The resistance 110 is coupled between the positive and negative inputs of the first amplifier 109. The voltage sense amplifier 111 is coupled to the battery 112. A positive node of the battery 112 is coupled to the positive input of the second amplifier 111 and the negative node of the battery 112 is coupled to the negative input of the second amplifier 111.

The current sense amplifier 109 outputs a voltage proportional to the measured battery charging current, $V_{IMEA}$. The voltage sense amplifier 111 outputs a voltage proportional to the measured battery voltage, $V_{VMEA}$. The voltage proportional to the measured battery charging current $V_{IMEA}$ is input to the constant current error amplifier circuit 102. The measured battery voltage indication $V_{VMEA}$ is an input to the constant voltage error amplifier which, for purposes of clarity, is not shown since it does not form a part of any embodiment disclosed herein.

An operation of the circuit of FIG. 1 provides charging and discharging of the battery 112. It can be seen that the circuit of FIG. 1 forms a feedback loop in that differences between the measured current level (e.g., output of analog front end 108) and target current level (e.g., output voltage of reference 136) are used to generate an error voltage that is a difference between the measured current and the reference target current, and generate a control voltage that is an amplified error voltage (by 102). The control voltage is then used to adjust the battery charge current $I_{BAT}$ from the power converter 106. Reference to the plots of FIG. 3 may be made in describing this operation.

Figure 3A:
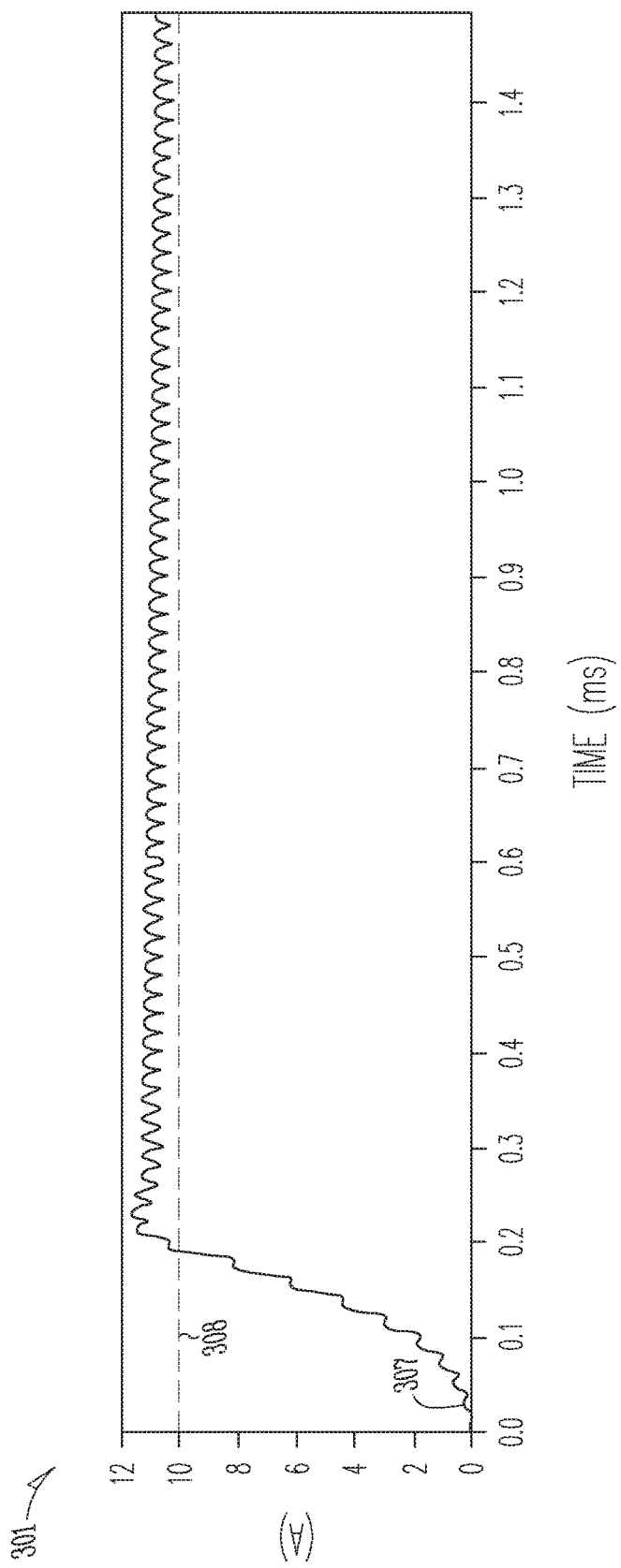
FIG. 3A is a plot showing operation of the battery charging circuit of FIG. 1, such as in accordance with various embodiments.
Figure 3B:
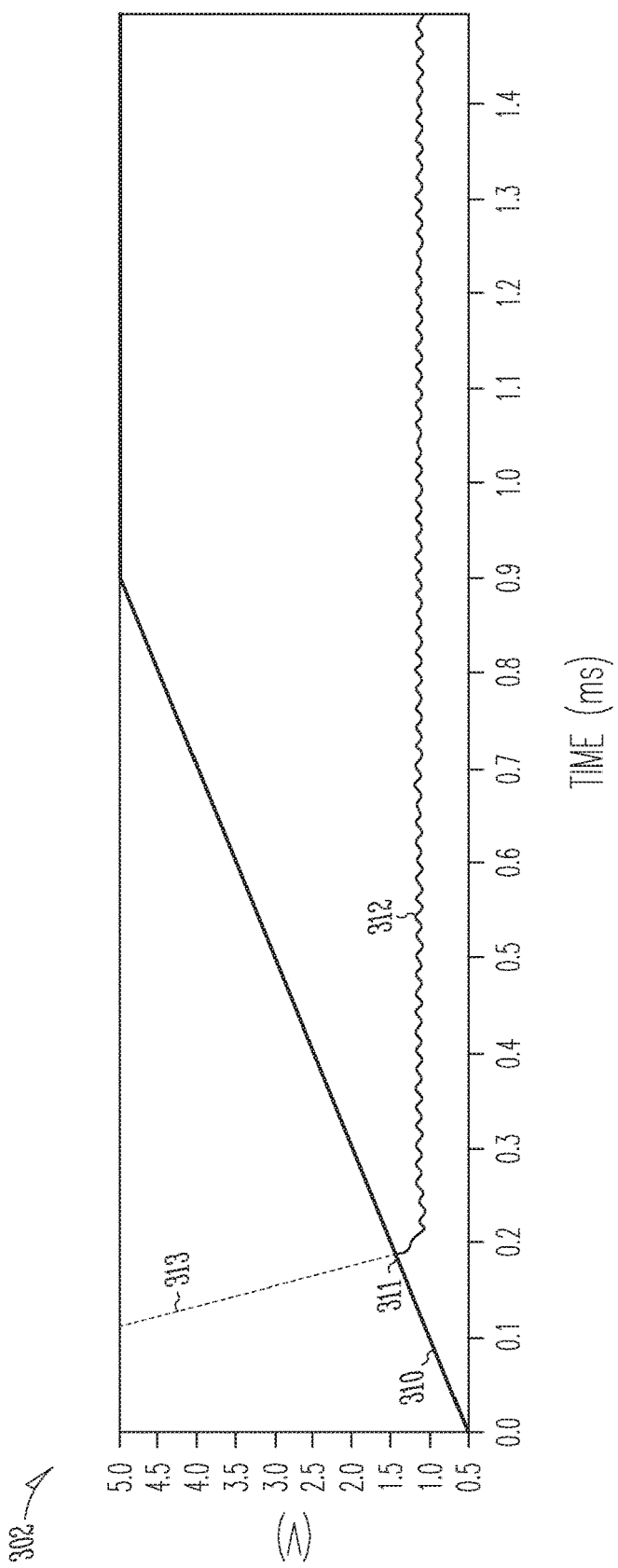
FIG. 3B is a plot showing operation of the battery charging circuit of FIG. 1, such as in accordance with various embodiments.

FIGS. 3A and 3B are plots 301, 302 showing operation of the battery charging circuit of FIG. 1, such as in accordance with various embodiments. The plot 301 of FIG. 3A shows time (in milliseconds (ms)) versus battery current (in Amperes (A)). The plot 302 of FIG. 3B shows time (ms) versus $V_{CTRL}$ voltage (in Volts (V)).

Referring to FIG. 1, the battery charge current setting reference 136 is initially set to represent some respective target charge current (e.g., 10 A) by a reference voltage at circuit 136. This reference level and the output voltage of amplifier 109 are used by the error amplifier circuit 102 in determining the $V_{CTRL}$ signal to set the output current of the power converter circuit 106 to set the battery current $I_{BAT}$ as described subsequently.

At power up of the circuit of FIG. 1, the charging current measured by the analog front end circuit 108 is going to be very low and substantially below the target charging current. This difference is shown in the plot 301 of FIG. 3A wherein the initial current 307 is shown substantially below the target current 308 level. This may be true for ti approximately 0.15 ins of time after power up of the circuit.

During this initial time 307, the difference between the voltage proportional to the measured charging current $V_{IMEA}$ and target reference, $V_{ISET}$, is large and the error amplifier circuit 102 causes output voltage $V_{INT}$ to go to a maximum value (e.g., supply voltage) in order to cause the power converter circuit 106 to output as much current as possible and correct the initial large error between the measured battery charging current $I_{BAT}$ and the target charge current. Thus, without the soft start circuit 100, the $V_{INT}$ signal would be the $V_{CTRL}$ signal to the pulse width modulator 104 and it would look like trace 313 in FIG. 3B. The pulse width modulator 104 converts the linear voltage level of the $V_{CTRL}$ signal into duty cycle control signals DL and DH to the power converter 106. The DL and DH signals then control the operation of the first and second switches 141, 142 of the power converter 106 during charge and discharge operations.

The pulse width modulator 104 provides translation of a linear voltage (e.g., $V_{CTRL}$) to duty cycle signals (e.g., DEL DL). The duty cycles of the DH and DL signals change proportionally and inversely to $V_{CTRL}$. In other words, as the $V_{CTRL}$ voltage level increases, the duty cycle of the DH signal increases and the duty cycle of the DL signal decreases. As the $V_{CTRL}$ voltage level decreases, the duty cycles of the DH signal decreases and the duty cycle of the DL signal increases. DH and DL have the same frequency but are opposite in phase; when one signal is high, the other signal is low.

As one example of a charging operation, when $V_{CTRL}$ is 0V, the duty cycles of DH and DL are 0% and 100% respectively (e.g., DL is always high and DH is always low); when $V_{CTRL}$ is 2V, the duty cycles of DH and DL are 50%; when $V_{CTRL}$ is 4V, the duty cycles of DH and DL are 100% and 0% respectively (e.g., DH is always high and DL is always low). During a discharge operation, DH and DL are opposite from their charging phase. These voltages and duty cycles are for purposes of illustration only as other embodiments may use other voltages and duty cycles.

It can be seen, with reference to FIG. 1, that increasing the duty cycle of signal DH and decreasing the duty cycle of signal DL increases the battery charge current $I_{BAT}$. Thus, during a charging operation, as $V_{CTRL}$ increases, the duty cycle of the DH signal increases, and, thus, increasing the charging current err. Therefore, the charging current $I_{BAT}$ is proportional to the control voltage $V_{CTRL}$. The soft start circuit 100 is a voltage follower circuit (with node SS voltage as the input) that generates a $V_{SSC}$ control signal that follows the node SS voltage and pulls the $V_{INT}$ signal down to the SS node voltage level so that, during the initial power up of the circuit, $V_{CTRL}$ is at the $V_{SSC}$ control signal voltage. As can be seen in FIGS. 1 and 2, at time 0, switch 206 keeps capacitor 114 discharged. Immediately after, at time 0+, the switch 206 opens and the current source 205 charges the capacitance 114 such that the voltage SS rises linearly towards $V_{DD}$ as signal 310 of FIG. 3B shows. The magnitude of the current supplied by current source 205 and value of capacitance 114, determine the rate which voltage SS rises towards $V_{DD}$.

Referring to the middle plot 302 of FIG. 3B, it can be seen that the $V_{CTRL}$ signal 312 is the minimum of the $V_{INT}$ control signal 313 or the $V_{SSC}$ control signal 310. Between time 0 ms and approximately 0.18 ms, the $V_{SSC}$ control signal 310 is the lower voltage. This control signal 310 sets $V_{CTRL}$ until point 311 wherein the signal SS continues to ramp up to the supply voltage $V_{DD}$ (e.g., approximately 5V), at a rate determined by capacitance 114 and current source 205, while the $V_{INT}$ voltage 313 has returned from its initial high voltage to being lower than the $V_{SSC}$ control signal 310. At point 311, $V_{INT}$ is now the lower voltage and sets the $V_{CTRL}$ signal 312.

Figure 4A:
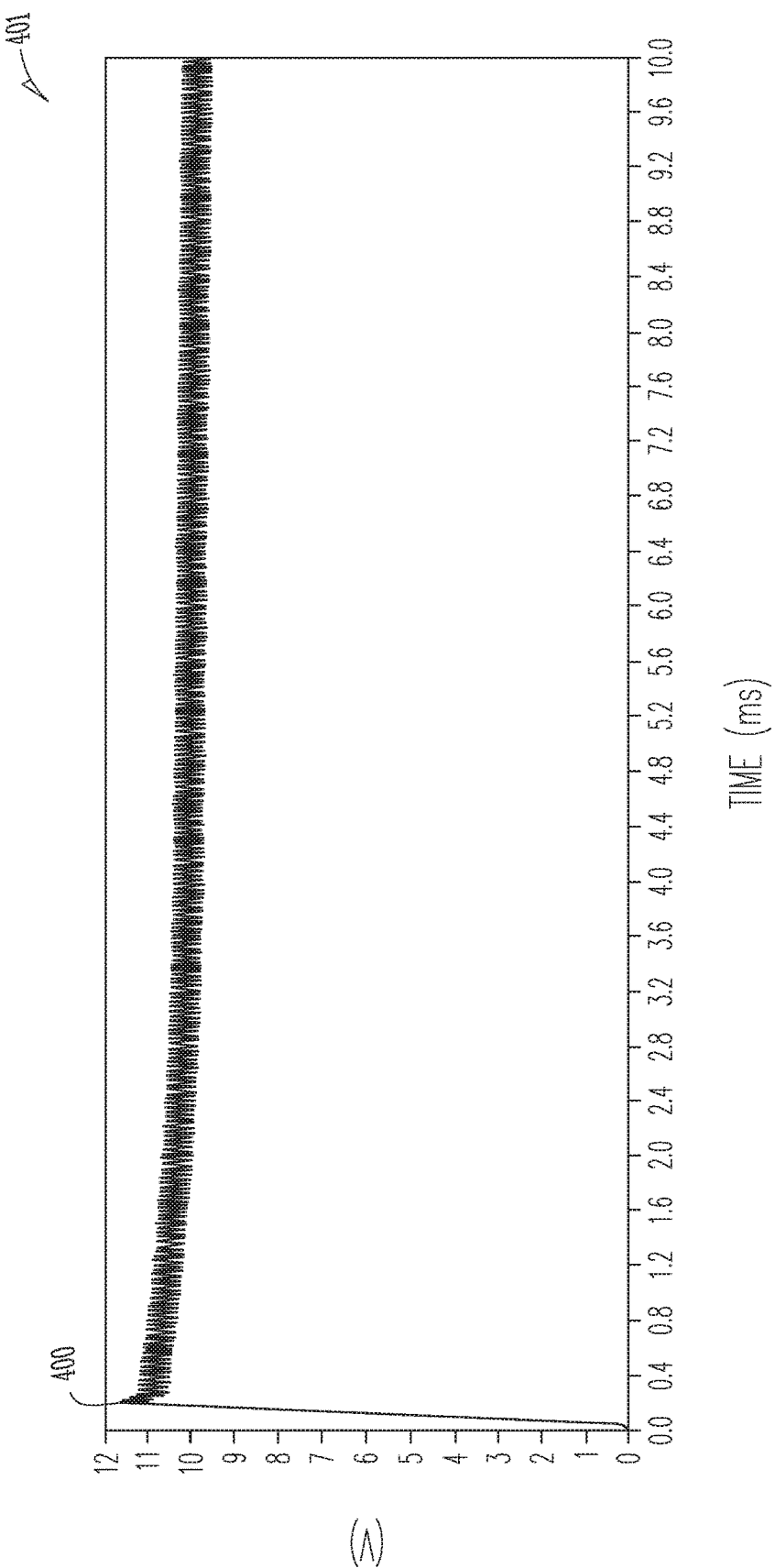
FIG. 4A is a plot showing operation of the battery charging circuit of FIG. 1, such as in accordance with various embodiments.
Figure 4B:
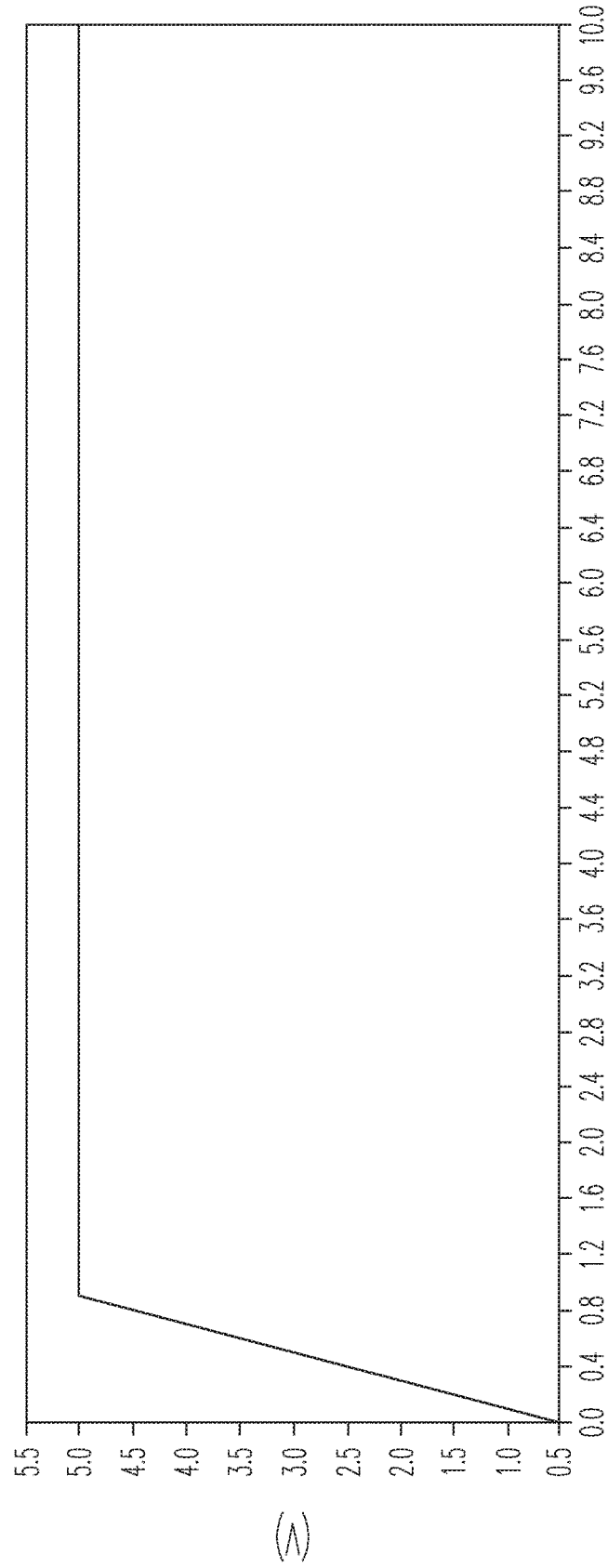
FIG. 4B is a plot showing operation of the battery charging circuit of FIG. 1, such as in accordance with various embodiments.

FIGS. 4A and 4B are plots 401, 402 showing operation of the battery charging circuit of FIG. 1 in a wider time scale, such as in accordance with various embodiments. These plots show a benefit of using the soft start circuit and method.

The plot 401 of FIG. 4A shows the battery charging current (in A) versus time. The plot 402 of FIG. 4B shows the soft start voltage SS versus time. It can be seen that battery charging current shows a relatively small overshoot 400 (e.g., 15%) at startup as the soft start voltage SS ramps up. This is in contrast to a conventional startup charging current overshoot of approximately 300% without using the soft start circuit 100 as seen in FIG. 1 and the method of FIG. 5. FIG. 6 illustrates a conventional current loop start-up circuit operation with the overshoot above the 10 A target current 601. The conventional current loop start-up circuit does not include the soft-start circuit disclosed herein.

Figure 5:
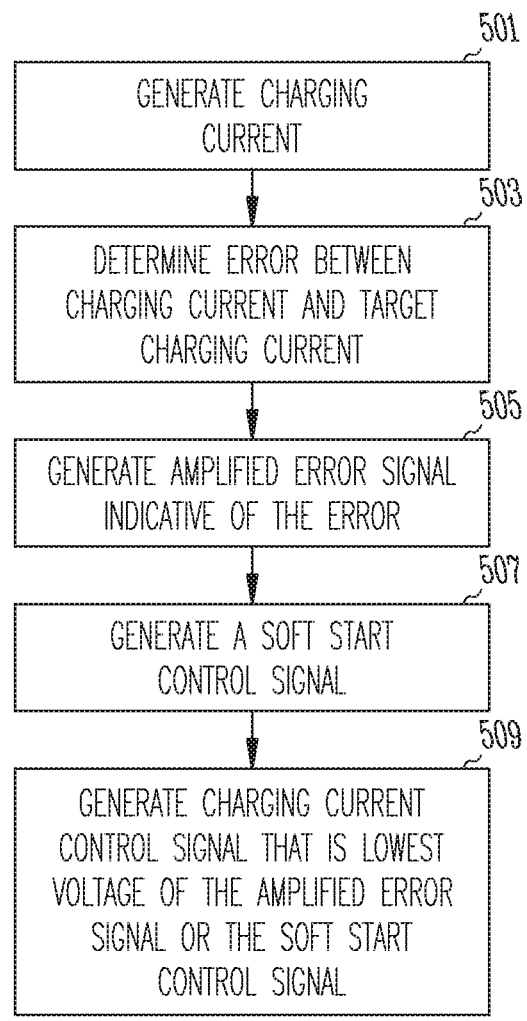
FIG. 5 is a flowchart of a method for reducing an inrush current in a circuit, such as in accordance with various embodiments.
Figure 6:
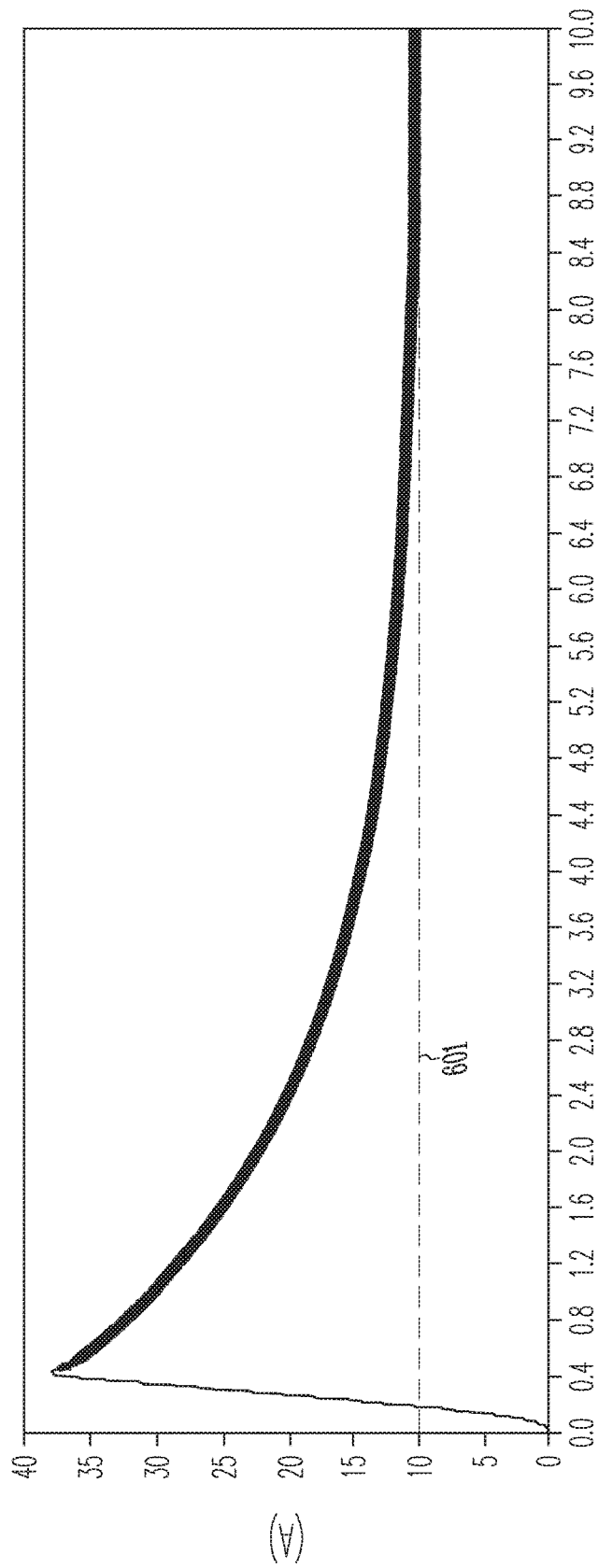
FIG. 6 is a plot showing a conventional current loop start-up operation without the soft-start circuit.

FIG. 5 is a flowchart of a method for reducing an inrush current in a circuit, such as in accordance with various embodiments. In block 501, a measured current is generated by the power converter. In block 503, an error is sensed between the measured current and a target reference current. In block 505, an amplified intermediate control voltage is generated that is proportional to the error between the measured current and the target reference current. In block 507, a soft start control voltage is generated. In block 509, a current control voltage is generated for controlling the measured current. The current control voltage is the lowest voltage of the amplified intermediate control voltage or the soft start control voltage.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not 13," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method for reducing an inrush current in a circuit, the method comprising:
   sensing an error between a measured current and a target reference current, wherein the measured current is measured based on a difference in a first voltage at a first node of a resistor and a second voltage at a second node of the resistor;
   generating an intermediate control voltage proportional to the error;
   generating a soft start control voltage; and
   generating a current control voltage for controlling the measured current wherein the current control voltage is a lowest voltage of the intermediate control voltage or the soft start control voltage.

2. The method of claim 1, further comprising measuring the current under control through the resistor coupled to a current sense amplifier to generate a measured indication of the current under control.

3. The method of claim 1, further comprising setting the target reference current by a reference voltage coupled to an error amplifier input.

4. The method of claim 1, wherein generating the intermediate control voltage comprises amplifying a voltage difference between a voltage proportional to the measured current and a reference voltage proportional to the target current.

5. The method of claim 1, wherein generating the soft start control signal comprises generating the soft start control signal based on a voltage configured to increase with time when power is applied to the circuit or the circuit is enabled.

6. The method of claim 1, wherein generating the soft start control signal comprises inputting an increasing with time voltage to a voltage follower circuit.

7. The method of claim 1, further comprising:
   generating a first signal having a duty cycle that is proportional to the current control voltage;
   generating a second signal having a duty cycle that is proportional to the soft start control voltage; and
   logically combining the first and second signals for controlling a first switch in a power converter.

8. The method of claim 7, further comprising:
   generating a second signal having a duty cycle that is inversely proportional to the current control voltage and opposite in phase to the duty cycle of the first signal; and
   controlling a second switch in the power converter.

9. The method of claim 8, wherein controlling the measured current comprises respectively controlling switching of the first switch and the second switch in response to the first and second duty cycle signals.

10. A method for reducing an inrush current in a charging circuit, the method comprising:
    generating a charging current on a charging line coupled to a battery;
    generating a measured current indication based on a measured difference in a first voltage at a first node of a resistor and a second voltage at a second node of the resistor;
    determining a current difference between the measured current indication and a target reference current;
    generating an intermediate control voltage indicative of the difference;
    generating a soft start control voltage based on a voltage configured to increase with time; and
    adjusting the charging current in response to a lowest voltage of the intermediate control voltage and the soft start control voltage.

11. The method of claim 10, wherein generating the measured current indication comprises measuring the charging current through a resistance in the charging line, and the resistance being coupled to an amplifier.

12. The method of claim 10, further comprising:
    generating a control signal comprising the lowest voltage of the intermediate control voltage and the soft start voltage; and
    generating first and second duty cycle signals, from the control signal, with a pulse width modulator.

13. The method of claim 12, further comprising:
controlling the output current of a power converter by controlling the duty cycle of the first and second duty cycle signals; and
coupling the output of the power converter to the charging line.

14. A circuit that reduces inrush current during power up, the circuit comprising:
circuitry configured to generate an intermediate control voltage indicative of a difference between a measured current and a target reference current, wherein the measured current is measured based on a difference in a first voltage at a first node of a resistor and a second voltage at a second node of the resistor;
circuitry configured to generate a soft start control voltage based on a voltage configured to increase with time; and
circuitry configured to generate the measured current responsive to a lower voltage of the intermediate control voltage or the soft start control voltage.

15. The charging circuit of claim 14, wherein the intermediate control voltage is generated by an error amplifier circuit, the soft start control voltage is generated by a soft start circuit, and the measured current is generated by a power converter circuit, further comprising a pulse width modulator circuit coupled to the error amplifier circuit and the soft start circuit, the pulse width modulator circuit configured to:
generate a first signal having a duty cycle that is proportional to a current control voltage that is based on an output of the error amplifier circuit,
generating a second signal having a duty cycle that is proportional to the soft start control voltage; and
logically combine the first and second signals for controlling the power converter circuit.

16. The charging circuit of claim 15, wherein the pulse width modulator adjusts the duty cycle of the duty cycle signals proportional with the error voltage or the soft start control voltage.

17. The charging circuit of claim 16, wherein the power converter circuit comprises at least one switch coupled to and controlled by the duty cycle signals.

18. The charging circuit of claim 14, further comprising a voltage follower circuit coupled to a voltage configured to increase with time when power is applied to the charging circuit or the charging circuit is enabled such that the soft start control voltage follows the voltage configured to increase with time.

19. The charging circuit of claim 14, further comprising an analog front end coupled to a charging line carrying the measured current, the analog front end configured to generate a measured current indication.

20. The charging circuit of claim 14, wherein the intermediate control voltage is generated by an error amplifier circuit, the soft start control voltage is generated by a soft start circuit, and the measured current is generated by a power converter circuit, further comprising a target current reference circuit coupled to the error amplifier circuit and configured to generate a voltage proportional to the target reference current.

21. A method for reducing an inrush current in a circuit, the method comprising:
sensing an error between a measured current and a target reference current;
generating an intermediate control voltage proportional to the error;
generating a soft start control voltage having a constant value; and
generating a current control voltage for controlling the measured current, wherein the current control voltage is a function of a difference, between the soft start control voltage having the constant value and the intermediate control voltage, and a threshold, such that the current control voltage corresponds to the soft start voltage while the difference exceeds the threshold and thereafter the current control voltage corresponds to the intermediate control voltage.

22. The method of claim 21, further comprising changing the intermediate control voltage while the current control voltage corresponds to the soft start voltage having the constant value.

23. The method of claim 21, wherein generating the intermediate control voltage comprises amplifying a voltage difference between a voltage proportional to the measured current and a reference voltage proportional to the target current.

24. The method of claim 21, wherein generating the soft start control signal comprises generating the soft start control signal based on a voltage configured to increase with time when power is applied to the circuit or the circuit is enabled.

25. The method of claim 21, wherein generating the current control voltage comprises:
receiving at a first input of an error amplifier the intermediate control voltage;
receiving at a second input of the error amplifier the soft start control voltage having the constant value; and
providing an output of the error amplifier to a gate of a transistor for controlling whether the measured current corresponds to the soft start voltage or to the intermediate control voltage.

26. A circuit that reduces inrush current during power up, the circuit comprising:
circuitry configured to generate an intermediate control voltage indicative of a difference between a measured current and a target reference current;
circuitry configured to generate a soft start control voltage having a constant value; and
circuitry configured to generate the measured current, wherein the measured current is a function of a difference, between the soft start control voltage having the constant value and the intermediate control voltage, and a threshold, such that the measured current corresponds to the soft start voltage while the difference exceeds the threshold and thereafter the measured current corresponds to the intermediate control voltage.

27. The charging circuit of claim 26, wherein the intermediate control voltage is generated by an error amplifier circuit, the soft start control voltage is generated by a soft start circuit, and the measured current is generated by a power converter circuit, wherein the soft start circuit comprises a voltage follower circuit coupled to a voltage configured to increase with time when power is applied to the charging circuit or the charging circuit is enabled such that the soft start control voltage follows the voltage configured to increase with time.

28. The charging circuit of claim 26, further comprising an analog front end coupled to a charging line carrying the measured current, the analog front end configured to generate a measured current indication that is input to an error amplifier circuit, wherein the measured current changes while the measured current corresponds to the soft start voltage having the constant value.

29. The charging circuit of claim 26, further comprising a first error amplifier circuit and a second error amplifier circuit having:
- a first input coupled to the intermediate control voltage;
- a second input coupled to the soft start control voltage having the constant value; and
- an output coupled to a gate of a transistor for controlling whether the measured current corresponds to the soft start voltage or to the intermediate control voltage.

30. A circuit comprising circuitry configured to:
- sense an error between a measured current and a target reference current, wherein the measured current is measured based on a difference in a first voltage at a first node of a resistor and a second voltage at a second node of the resistor;
- generate an intermediate control voltage proportional to the error;
- generate a soft start control voltage; and
- generate a current control voltage for controlling the measured current wherein the current control voltage is a lowest voltage of the intermediate control voltage or the soft start control voltage.

31. A circuit comprising:
circuitry configured to:
- generate a charging current on a charging line coupled to a battery;
- generate a measured current indication based on a measured difference in a first voltage at a first node of a resistor and a second voltage at a second node of the resistor;
- determine a current difference between the measured current indication and a target reference current;
- generate an intermediate control voltage indicative of the difference;
- generate a soft start control voltage based on a voltage configured to increase with time; and
- adjust the charging current in response to a lowest voltage of the intermediate control voltage and the soft start control voltage.

32. The charging circuit of claim 14, wherein the intermediate control voltage is generated by an error amplifier circuit, the soft start control voltage is generated by a soft start circuit, and the measured current is generated by a power converter circuit coupled to the error amplifier circuit and the soft start circuit.

33. The charging circuit of claim 26, wherein the intermediate control voltage is generated by an error amplifier circuit, the soft start control voltage is generated by a soft start circuit, and the measured current is generated by a power converter circuit coupled to the error amplifier circuit and the soft start circuit.

* * * * *

UNITED STATES PATENT AND TRADEMARK OFFICE
CERTIFICATE OF CORRECTION

PATENT NO. : 10,141,763 B2
APPLICATION NO. : 15/258897
DATED : November 27, 2018
INVENTOR(S) : Herrera et al.

Page 1 of 1

It is certified that error appears in the above-identified patent and that said Letters Patent is hereby corrected as shown below:

In the Claims

In Column 9, Line 32, in Claim 15, delete "circuit," and insert --circuitry;-- therefor In Column 11, Line 10, in Claim 30, after "comprising", insert --:--

Signed and Sealed this
Twelfth Day of May, 2020

Andrei Iancu
*Director of the United States Patent and Trademark Office*